US012625078B2

(12) United States Patent (10) Patent No.: US 12,625,078 B2
Yang et al. (45) Date of Patent: May 12, 2026

(54) METHOD FOR ESTIMATING MASS OF MICROPLASTICS BY USING FLUORESCENT STAINING

(71) Applicant: PUKYONG NATIONAL UNIVERSITY INDUSTRY-UNIVERSITY COOPERATION FOUNDATION, Busan (KR)

(72) Inventors: Min June Yang, Busan (KR); Su Hyeon Park, Busan (KR); Tae Jung Ha, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 476 days.

(21) Appl. No.: 18/316,470

(22) Filed: May 12, 2023

(65) Prior Publication Data

US 2024/0280489 A1 Aug. 22, 2024

(30) Foreign Application Priority Data

Feb. 17, 2023 (KR) ........................ 10-2023-0021580

(51) Int. Cl.
*G01N 21/64* (2006.01)
*G06T 7/00* (2017.01)
(52) U.S. Cl.
CPC ........... *G01N 21/643* (2013.01); *G06T 7/001* (2013.01); *G06T 2207/10056* (2013.01); *G06T 2207/20084* (2013.01)
(58) Field of Classification Search
CPC .............. G01N 21/643; G01N 33/442; G01N 2015/1493; G01N 21/6456; G06T 7/001;
(Continued)

(56) References Cited

U.S. PATENT DOCUMENTS

2020/0234420 A1* 7/2020 Liu ........................... G06T 5/50

FOREIGN PATENT DOCUMENTS

KR        10-2296894 B1    9/2021
KR   10-2022-0033940 A    3/2022
(Continued)

OTHER PUBLICATIONS

"Quantification of Microplastics Mass Concentration using Images of Microplastics Stained with Nile Red", AGU Fall Meeting 2022.
(Continued)

*Primary Examiner* — Jennifer Wecker
*Assistant Examiner* — Tracy Ching-Tian Colena
(74) *Attorney, Agent, or Firm* — Knobbe, Martens, Olson & Bear, LLP

(57) ABSTRACT

Proposed is a method for estimating the mass of microplastics by using fluorescent staining. The method may include staining microplastic samples by using a Nile red solution, and capturing a fluorescent image of each of the stained microplastic samples after classifying the stained microplastic samples by mass. The method may also include analyzing the captured fluorescent image to quantify a fluorescence intensity thereof to build a database (DB) about a correlation between mass and fluorescence intensity of microplastics. The method may further include estimating a mass value of an unknown microplastic sample by comparing a fluorescence intensity of a fluorescent image of the unknown microplastic sample obtained by performing the staining and capturing of the unknown microplastic sample with data stored in the database.

8 Claims, 10 Drawing Sheets

(58) Field of Classification Search
CPC ......... G06T 2207/10056; G06T 7/0014; G06T
2207/20084; G02B 21/06
See application file for complete search history.

(56) References Cited

FOREIGN PATENT DOCUMENTS

KR     10-2022-0093623 A    7/2022
KR     10-2447224 B1    9/2022
KR     20220141313 A  * 10/2022  ......... G01N 21/6458

OTHER PUBLICATIONS

Oh et al., "Selective Fluorescence Staining of Microplastic in Water
Utilizing Nile Red/surfactant Combination", Polym. Korea, vol. 46,
No. 6, pp. 827-836 (2022).

* cited by examiner

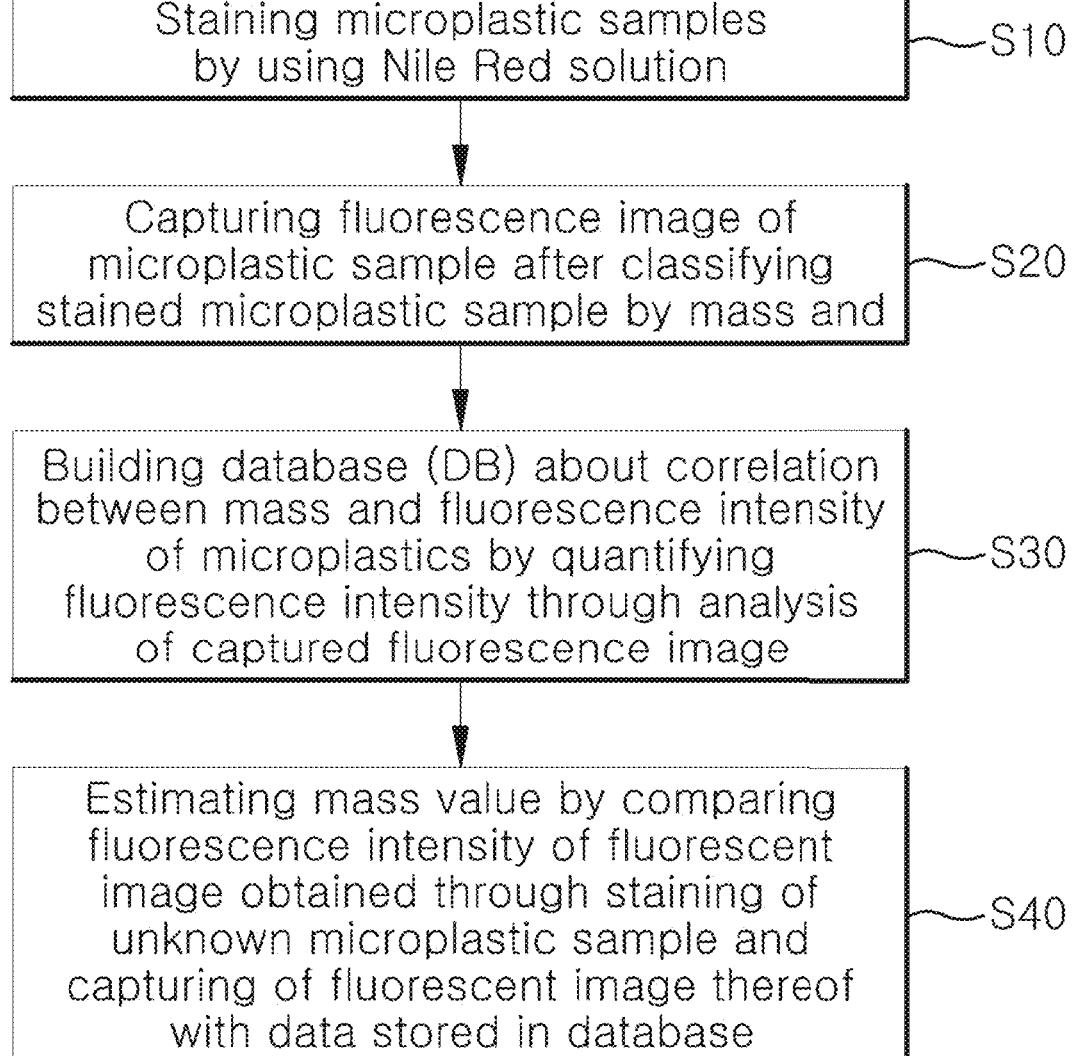

Staining microplastic samples
by using Nile Red solution ~S10

Capturing fluorescence image of
microplastic sample after classifying
stained microplastic sample by mass and ~S20

Building database (DB) about correlation
between mass and fluorescence intensity
of microplastics by quantifying
fluorescence intensity through analysis
of captured fluorescence image ~S30

Estimating mass value by comparing
fluorescence intensity of fluorescent
image obtained through staining of
unknown microplastic sample and
capturing of fluorescent image thereof
with data stored in database ~S40

FIG. 1

METHOD FOR ESTIMATING MASS OF MICROPLASTICS BY USING FLUORESCENT STAINING

CROSS REFERENCE TO RELATED APPLICATION

The present application claims priority to Korean Patent Application No. 10-2023-0021580, filed Feb. 17, 2023, the entire contents of which are incorporated herein for all purposes by this reference.

BACKGROUND

Technical Field

The present disclosure relates generally to device and method for estimating the mass of microplastics. More particularly, the present disclosure relates to a method for estimating the mass of microplastics by using fluorescent staining, in which by using fluorescent staining, the mass of microplastics can be efficiently quantified with a simpler configuration and at lower cost than the conventional methods of analyzing microplastics in order to solve the problems of the conventional methods for analyzing microplastics with the limitations that most of conventional quantitative analyses of microplastics are performed by a method (FT-IR spectroscopy, raman spectroscopy) of counting microplastics by observing the microplastics with a microscope and by a mass spectrometry method (Py GC-MS) based on thermal decomposition, but due to the very high price of analysis devices for this purpose, it was difficult to use the devices in a general laboratory environment, and further, the conventional analysis method of counting microplastics requires long time for analysis, and the conventional analysis method using thermal decomposition is a destructive analysis method.

In addition, the present disclosure relates to a method for estimating the mass of microplastics by using fluorescent staining, in which microplastics are stained with a Nile red solution, the stained microplastics are weighted and photographed with a camera, a DB in which fluorescence intensity corresponding to the mass of the microplastics is quantified through the image analysis of the microplastics is generated, and a mass value of the microplastics is estimated through fluorescence intensity of a measured unknown sample, so that by using fluorescent staining, the method of the present disclosure can more efficiently quantify the mass of microplastics than the conventional methods and can be easily applied even to an experiment in which a large amount of analysis samples occurs by reducing cost and time required for analysis in order to solve the problems of the conventional methods for analyzing microplastics with the limitations that in addition to the very high price of the analysis devices as described above, the method of counting microplastics requires long time for analysis and the method of using thermal decomposition is a destructive analysis method.

Description of Related Technology

Generally, microplastics refer to pieces (particles) of plastic that are less than 5 mm in size. Recently, as environmental pollution has emerged as a serious problem worldwide, the danger of microplastics has become known, and research on the technology to quickly and accurately perform qualitative and quantitative analyses of microplastics present in water or the body of fish and shellfish is actively being conducted.

SUMMARY

One aspect is a method for estimating the mass of microplastics by using fluorescent staining, in which by using fluorescent staining, the mass of microplastics can be efficiently quantified with a simpler configuration and at lower cost than the conventional methods of analyzing microplastics in order to solve the problems of the conventional methods for analyzing microplastics with the limitations that most of conventional quantitative analyses of microplastics are performed by a method (FT-IR spectroscopy, raman spectroscopy) of counting microplastics by observing the microplastics with a microscope and by a mass spectrometry method (Py GC-MS) based on thermal decomposition, but due to the very high price of analysis devices for this purpose, it was difficult to use the devices in a general laboratory environment, and further, the conventional analysis method of counting microplastics requires long time for analysis, and the conventional analysis method using thermal decomposition is a destructive analysis method.

Another aspect is a method for estimating the mass of microplastics by using fluorescent staining, in which microplastics are stained with a Nile red solution, the stained microplastics are weighted and photographed with a camera, a DB in which fluorescence intensity corresponding to the mass of the microplastics is quantified through the image analysis of the microplastics is generated, and a mass value of the microplastics is estimated through fluorescence intensity of a measured unknown sample, so that by using fluorescent staining, the method of the present disclosure can more efficiently quantify the mass of microplastics than the conventional methods and can be easily applied even to an experiment in which a large amount of analysis samples occurs by reducing cost and time required for analysis in order to solve the problems of the conventional methods for analyzing microplastics with the limitations that in addition to the very high price of the analysis devices as described above, the method of counting microplastics requires long time for analysis and the method of using thermal decomposition is a destructive analysis method.

In order to achieve the above objective, according to one aspect of the present disclosure, there is provided a method for estimating mass of microplastics by using fluorescent staining, the method including: staining microplastic samples by using a Nile red solution; capturing a fluorescent image of each of the stained microplastic samples after classifying the stained microplastic samples by mass; analyzing the captured fluorescent image to quantify a fluorescence intensity thereof so that a database (DB) about a correlation between mass and fluorescence intensity of microplastics is built; and estimating a mass value of an unknown microplastic sample by comparing a fluorescence intensity of a fluorescent image of the unknown microplastic sample obtained by performing the staining and capturing of the unknown microplastic sample with data stored in the database.

Here, in the staining, Nile red may be dissolved in an acetone solvent to prepare a Nile red staining solution with a predetermined concentration, microplastic particles with a predetermined mass may be stained with the Nile red staining solution, and may be cooled after stirred according to temperature, time, and speed preset to prepare the microplastic samples.

In addition, in the capturing, the microplastic samples stained completely through the staining may be separated from the solution through a vacuum filtration process and be dried, the dried microplastic samples may be classified by mass according to a predetermined setting, and the capturing of the fluorescent image of each of the microplastic samples classified by mass may be performed.

Furthermore, in the capturing, the fluorescent image of the microplastic sample may be captured by using visible blue light with a wavelength of 470 nm.

Furthermore, in the analyzing, by using an image processing software comprising ImageJ, a mean gray value (MGV) of the fluorescent image of the microplastic sample may be obtained to quantify the fluorescence intensity so that a correlation between mass and fluorescence intensity of microplastics is calculated.

In addition, in the estimating, after an unknown microplastic sample to be measured is stained with Nile red and a fluorescent image thereof is captured, a fluorescence intensity of the fluorescent image may be analyzed, and a predetermined reference mass based on a correlation between mass and fluorescence intensity of microplastics stored in the database may be compared with the fluorescence intensity of the unknown microplastic sample to estimate a mass value of the unknown microplastic sample.

Furthermore, in the estimating, learning of a correlation between mass and fluorescence intensity of microplastics may be performed by using deep learning or machine learning, or an artificial intelligence learning algorithm including an artificial neural network (ANN), a recurrent neural network (RNN), and a convolutional neural network (CNN), and a process of estimating mass of an unknown microplastic sample based on a result of the learning may be automatically performed.

Furthermore, according to the present disclosure, a device for measuring mass of microplastics includes: an input part configured to receive a fluorescent image of a microplastic sample to be measured; an image analysis processing part configured to estimate mass of microplastics by comparing the fluorescent image input through the input part with data pre-stored in a database; and an output part configured to output and visually display various data comprising the fluorescent image input through the input part and an analysis result of the image analysis processing part, wherein the image analysis processing part is configured to estimate mass of microplastics by using the method for estimating mass of microplastics by using fluorescent staining described above.

In addition, the present disclosure provides a recording medium readable in a computer having a recorded program configured to execute, through a computer, a process in which by using the method for estimating mass of microplastics by using fluorescent staining described above, a fluorescent image of a microplastic sample to be measured is received and is compared with data pre-stored in a database so as to estimate mass of microplastics.

As described above, the present disclosure provides the method for estimating the mass of microplastics by using fluorescent staining, in which microplastics are stained with the Nile red solution, the stained microplastics are weighed and photographed with a camera, a DB in which the fluorescence intensity corresponding to the mass of the microplastics is quantified through the image analysis is generated, and the mass value of the microplastics is estimated through fluorescence intensity of a measured unknown sample, thereby quantifying the mass of microplastics more efficiently by using fluorescent staining than conventional methods and being applied even to an experiment in which a large amount of analysis samples occurs by reducing cost and time required for analysis.

In addition, the present disclosure provides the method for estimating the mass of microplastics by using fluorescent staining, in which by using fluorescent staining as described above, the mass of microplastics can be efficiently quantified with a simpler configuration and at lower cost than conventional methods, so it is possible to solve the problems of the conventional methods of analyzing microplastics with the limitations that due to the very high price of an analysis device, it is difficult to use the device in a general laboratory environment, a conventional analysis method of counting the microplastics by observing the microplastics with a microscope requires long time for analysis, and a conventional mass analysis method based on the thermal decomposition is a destructive analysis method.

BRIEF DESCRIPTION OF THE DRAWINGS

The above and other objectives, features, and other advantages of the present disclosure will be more clearly understood from the following detailed description when taken in conjunction with the accompanying drawings.

FIG. 1 is a flowchart schematically showing the overall configuration of a method for estimating the mass of microplastics by using fluorescent staining according to an embodiment of the present disclosure.

DETAILED DESCRIPTION

Figure 2:
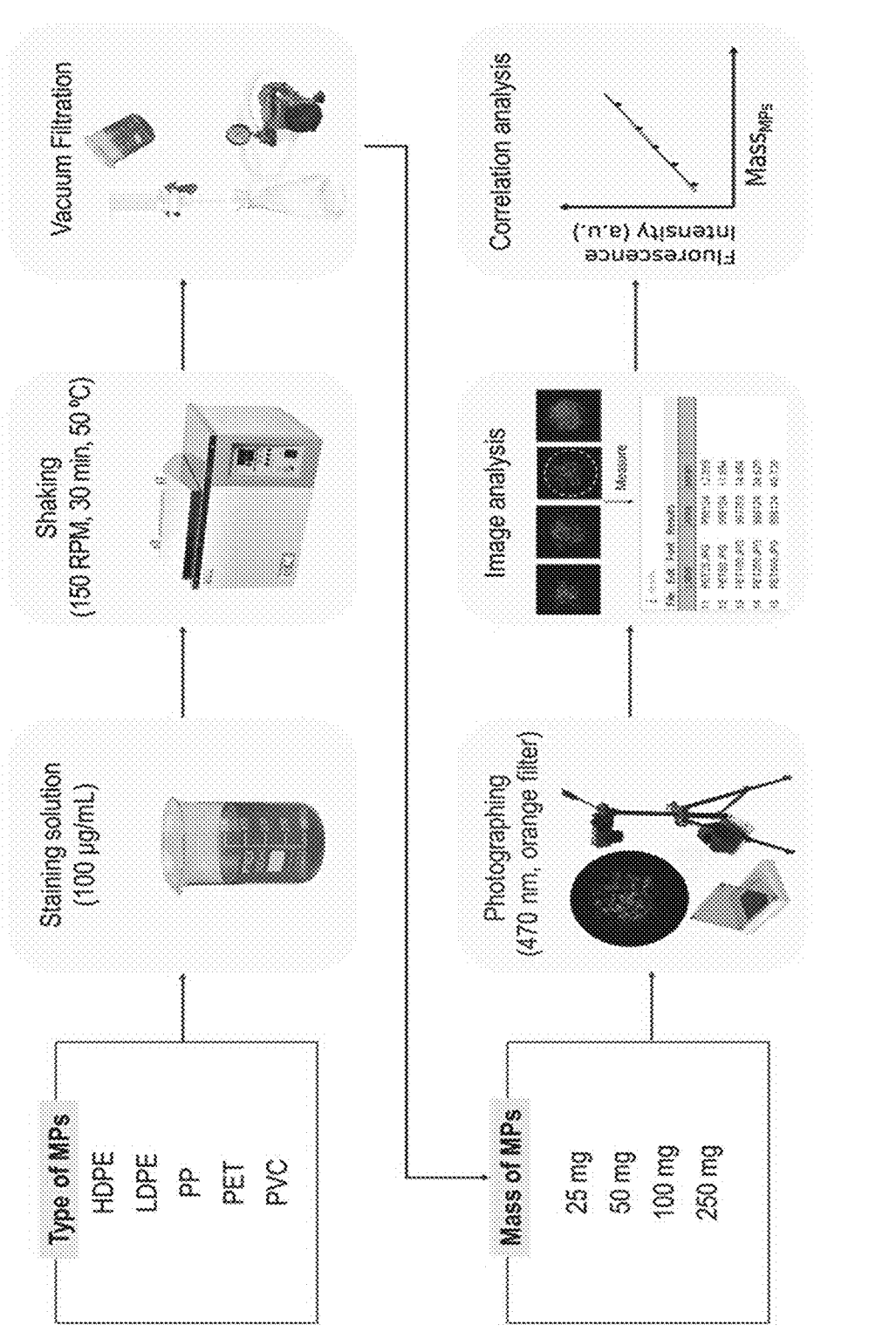
FIG. 2 is a conceptual diagram schematically showing the entire processing process of the method for estimating the mass of microplastics by using fluorescent staining according to the embodiment of the present disclosure shown in FIG. 1.

As disclosed in "APPARATUS FOR QUALITATIVE AND QUANTITATIVE ANALYSIS OF FINE PARTICLES" of Korean Patent No. 10-2447224 and "REAL-TIME MICROPLASTIC ANALYSIS DEVICE" of Korean Patent No. 10-2296894, various devices and methods for performing an analysis process more rapidly and accurately for conventional quantitative and qualitative analyses of microplastics have been proposed. However, the above analysis devices and methods as described above have the following problems.

More specifically, most of the quantitative analyses of microplastics are performed by a method (FT-IR spectroscopy, raman spectroscopy) of counting microplastics by observing the microplastics with a microscope and by a mass spectrometry method (Py GC-MS) based on thermal decomposition. However, due to the very high price of the analysis devices for this purpose, it was difficult to use the devices in a general laboratory environment.

In addition, the above analysis method in which microplastics are counted requires long time for analysis, and the conventional analysis method using thermal decomposition is a destructive analysis method.

Accordingly, in order to solve the limitations of the above quantitative analysis devices and methods of microplastics as described above, proposed is the new device and method of analyzing microplastics with a simpler configuration and at lower cost than the above described devices and methods of analyzing microplastics so that the mass of microplastics can be efficiently quantified, but a device and a method that satisfy all such requirements have not yet been proposed.

Hereinafter, an embodiment of a method for estimating the mass of microplastics by using fluorescent staining according to the present disclosure will be described in detail with reference to the accompanying drawings.

Here, it should be noted that contents described below are only one embodiment for implementing the present disclosure, and the present disclosure is not limited to the contents of the embodiment described below.

In addition, in the description of the embodiment of the present disclosure below, for parts that are identical or similar to the contents of the prior art or that are determined to be easily understood and implemented at the level of those skilled in the art, the detailed description thereof is omitted to simplify the description of the present disclosure.

Continuously, specific details of the method for estimating the mass of microplastics by using fluorescent staining according to the present disclosure will be described with reference to the drawings.

Here, microplastics are hydrophobic materials composed of hydrocarbons derived from petroleum and biomass, and a Nile red dye has the characteristic of generating strong fluorescence only in a hydrophobic environment. In consideration of this, visualization and identification of microplastics can be improved by staining the microplastics with Nile red.

That is, the stained microplastics emit fluorescence when irradiated with light from a light source in a UV/VIS wavelength range, the image of the fluorescence is captured through a camera to perform the analysis of the image, a correlation between fluorescence intensity obtained from the image and the value of the mass of microplastics already known is quantified so that the mass value of an unknown sample can be derived from the fluorescent image of the unknown sample.

To this end, in the present disclosure, as will be described later, five types of microplastics (PP, LDPE, HDPE, PET, and PVC) are stained with a Nile Red solution, divided into predetermined masses to prepare samples, and fluorescent images thereof are obtained through photographing.

In addition, in order to quantify a relative fluorescence intensity by using image processing software (ImageJ), a mean gray value (MGV) of a photograph is calculated, and correlation coefficient analysis between the mass of microplastics and the MGV, that is, two variables, is performed.

Furthermore, in order to numerically evaluate the results of the correlation analyses, Pearson's correlation coefficients are calculated. As a result, it was found that all types of microplastics show high positive correlations (PP; $r=0.9930$, LDPE; $r=0.9947$, HDPE; $r=0.9998$, PET; $r=0.9830$, and PVC; $r=0.9937$). Accordingly, the method for estimating a mass according to the present disclosure is expected to be able to reliably estimate the mass of an unknown sample through the building of a DB with an extended reference mass range.

More specifically, first, referring to FIG. 1, FIG. 1 is a flowchart schematically showing the overall configuration of the method for estimating the mass of microplastics by using fluorescent staining according to the embodiment of the present disclosure.

As shown in FIG. 1, the method for estimating the mass of microplastics by using fluorescent staining according to the embodiment of the present disclosure may largely include staining microplastics by using the Nile red solution at S10, capturing a fluorescent image of the stained microplastics with the camera after weighing the stained microplastics at S20, analyzing the fluorescent image to quantify fluorescence intensity corresponding to the mass of the microplastics so that a database (DB) about a correlation between the mass and fluorescence intensity of microplastics is generated at S30, and estimating a value of the mass of an unknown sample by comparing measured fluorescence intensity of the unknown sample with data stored in the database at S40.

Here, plastic is a high molecular material composed of hydrocarbons and has hydrophobic characteristics, and Nile red, which is a lipophilic dye with hydrophobicity, is adsorbed on the surface of microplastics when reacting with the microplastics, so the microplastics are fluorescent. Accordingly, in the present disclosure, fluorescent staining is used to quickly detect microplastics of 5 mm or less in size in environmental samples.

That is, in the present disclosure, fluorescent staining is performed on 5 types of microplastic polymers (LDPE, HDPE, PP, PVC, and PET) most frequently found in the environment. Since there is no standardized staining procedure and condition for Nile red staining, each researcher applies a different condition such as different dye concentration, solvent, incubation time, and staining temperature, but in the present disclosure, fluorescent microplastics are prepared in consideration of the most used condition.

More specifically, referring to FIG. 2, FIG. 2 is a conceptual diagram schematically showing the entire processing process of the method for estimating the mass of microplastics by using fluorescent staining according to the embodiment of the present disclosure shown in FIG. 1.

As shown in FIG. 2, the staining of microplastics by using the Nile red solution described above at S10 may include preparing a Nile red staining solution with a concentration of 100 μg/mL by dissolving Nile red in an acetone solvent, and staining 1 g of the microplastics with the Nile red solution.

In this case, a microplastic polymer is stirred at 150 RPM for 30 minutes at a temperature of 50° C. preset in a shaking incubator and is cooled with ice water so that Nile red molecules physically adsorbed between the chain structures of the microplastic polymer loosened due to the heating are not easily detached so as to be manufactured as one particle.

Next, as shown in FIG. 2, in the capturing of the fluorescent image of the microplastics at S20, the microplastics stained completely through the staining at S10 are separated from the solution through a vacuum filtration process, dried, weighted, and classified into predetermined masses (10, 25, 50, and 100 mg), and a fluorescent image is captured for each of the masses.

Figure 3:
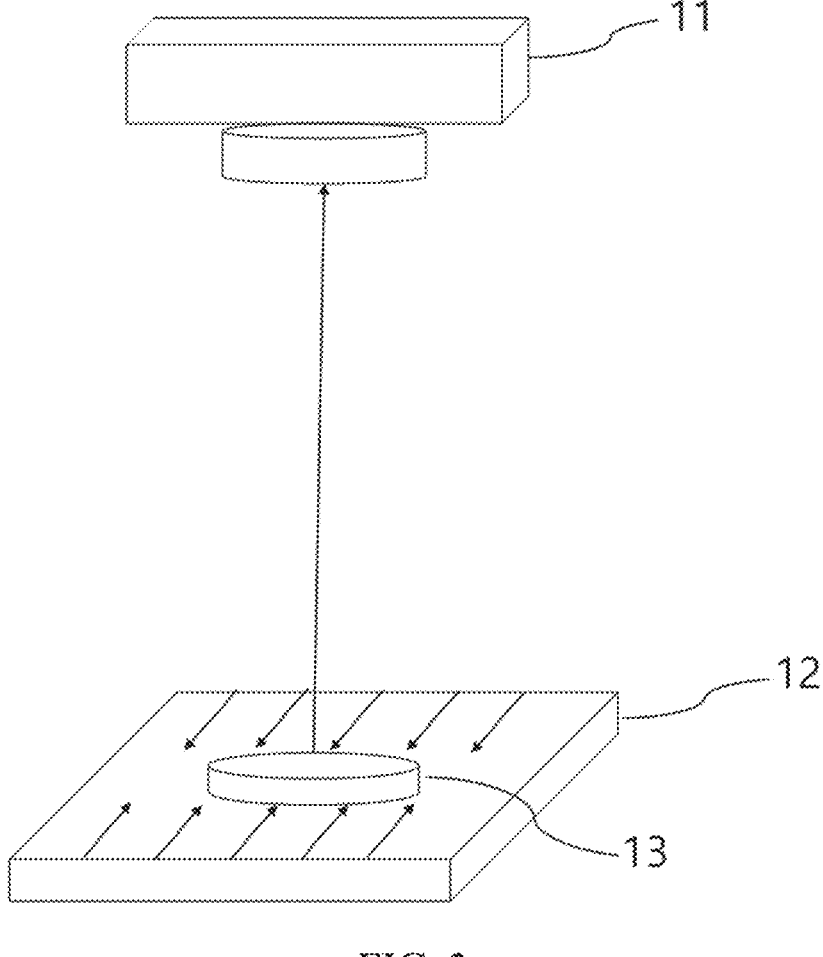
FIG. 3 is a diagram schematically showing the configuration of an experimental device for capturing the fluorescent image of microplastics stained completely.

That is, referring to FIG. 3, FIG. 3 is a diagram schematically showing the configuration of an experimental device for capturing the fluorescent image of microplastics stained completely.

As shown in FIG. 3, by placing the stained microplastic sample 13 between the camera 11 and a visible light lamp 12, a fluorescent image is captured for each mass, and the intensity of the fluorescent image is quantified through image analysis of the captured fluorescent image, and thus a database about a correlation between the intensity and the mass may be built.

Here, fluorescence refers to a phenomenon of absorbing light with a short wavelength and emitting light with a longer wavelength than the absorbed wavelength, and a microplastic sample stained with Nile red is required to be excited by the emission of light from a fluorescence microscope or UV/VIS light lamp to analyze fluorescence.

In addition, an excitation wavelength used for the microplastics stained with Nile red is 254 to 580 nm, which is variously proposed in the prior art, but in the present disclosure, based on the fact that the most frequently used wavelength for detecting microplastic particles is 450 to 490 nm, the fluorescence imaging of the microplastics is performed by using visible blue light with a wavelength of 470 nm.

Continuously, as shown in FIGS. 1 to 3, in the analyzing of a fluorescent image at S30 described above, after the capturing of the fluorescent image, the fluorescence intensity is quantified through the analysis of the image. To this end, in the embodiment of the present disclosure, the processing of quantifying the fluorescence intensity of the image of the microplastics may be performed through the image processing software based on an open source called "ImageJ (National Institutes of Health, USA)".

More specifically, the method of expressing the fluorescence intensity of the image as a relative value in "ImageJ" is to obtain a mean gray value (MGV). The mean gray value, which is a number that reflects the average intensity of pixels over a range between 0 (black) and 255 (white) after converting an RGB image to a gray scale, is a value obtained by dividing the sum of gray values of all pixels in a region of interest by the number of pixels in the region of interest.

In addition, when the particle sizes of microplastics are the same, the mass of the microplastics is proportional to the number of the microplastics, and thus as the number of microplastics with the same particle sizes increases in an area having the same number of pixels, the MGV increases.

Figure 4:
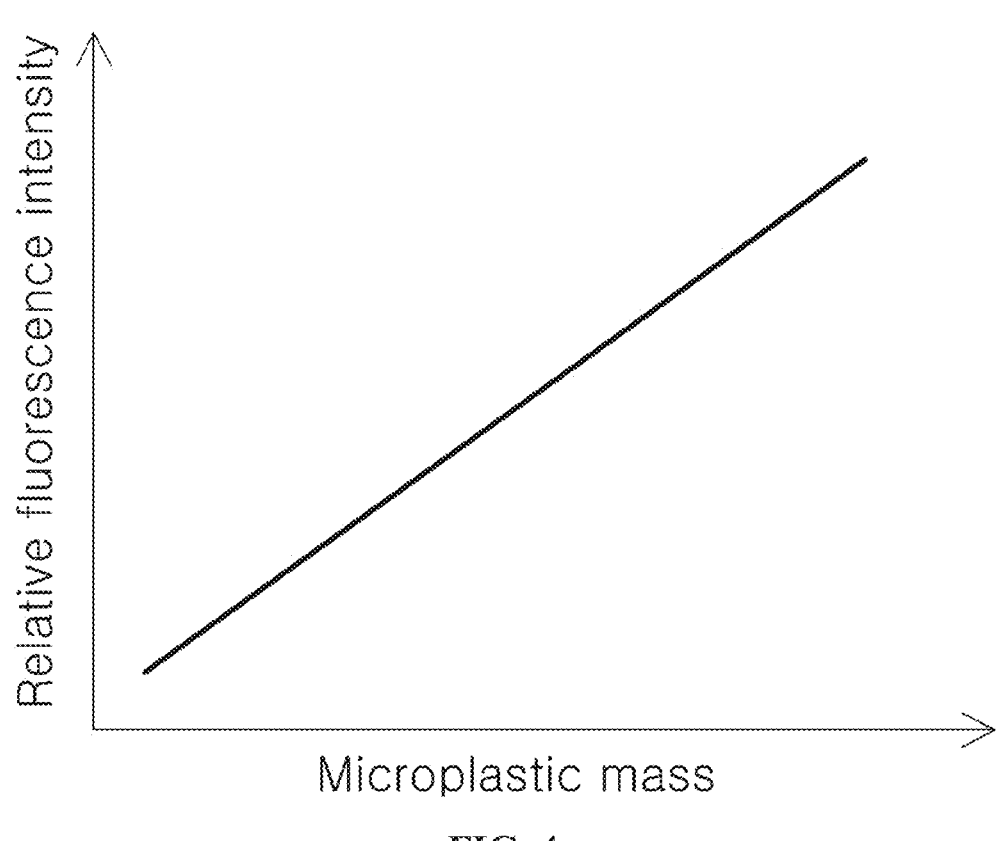
FIG. 4 is a graph showing a correlation between the mass of microplastics and the fluorescent image intensity.

That is, referring to FIG. 4, FIG. 4 is a graph showing a correlation between the mass of microplastics and fluorescent image intensity thereof.

As shown in FIG. 4, in the present disclosure, based on the fact that the mass of microplastics is proportional to the relative intensity of the fluorescent image, the intensity of the fluorescent image of the microplastic is quantified relative to the mass of the microplastics, and a database about a correlation between the mass of the microplastics and the intensity of the fluorescent image is built.

More specifically, the process of formulating the correlation between the mass and the fluorescence intensity of the image is required to derive a mass value from the fluorescence intensity of an unknown sample.

That is, referring to FIGS. 5A, 5B, 5C, 5D, and 5E, FIGS. 5A, 5B, 5C, 5D, and 5E are graphs showing the results of analyzing a correlation between the mass and fluorescence intensity according to types of microplastic polymers.

Figure 5A:
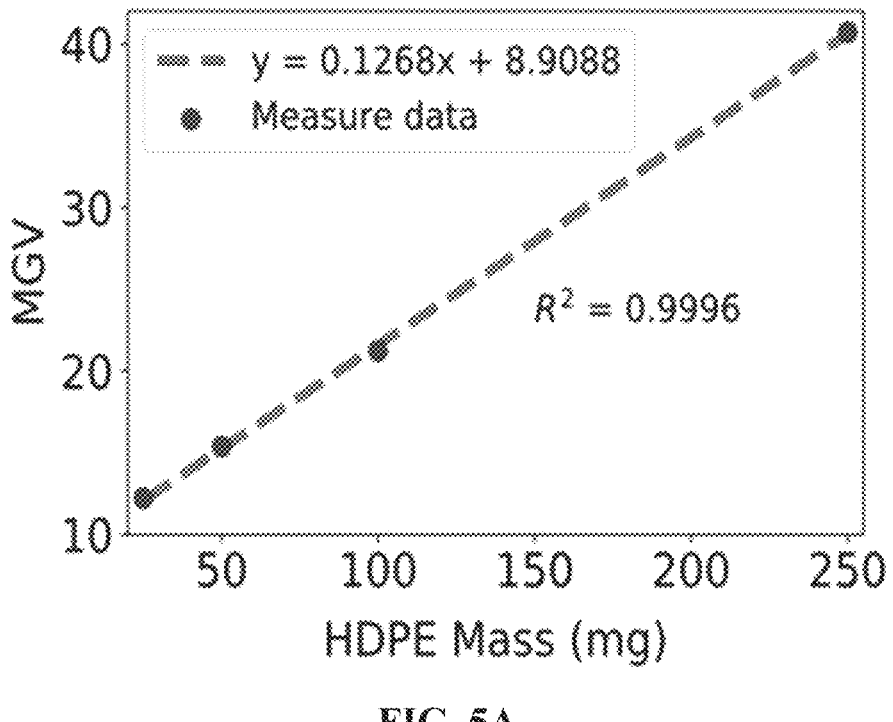
FIGS. 5A, 5B, 5C, 5D, and 5E are graphs showing the results of analyzing a correlation between the mass and fluorescence intensity according to types of microplastic polymers.
Figure 5B:
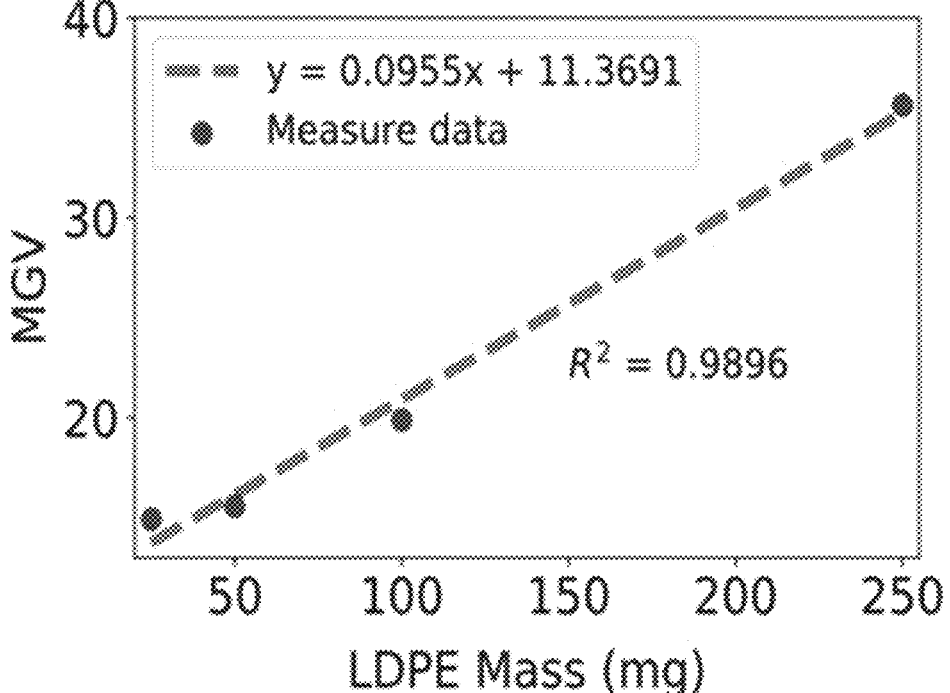
Figure 5C:
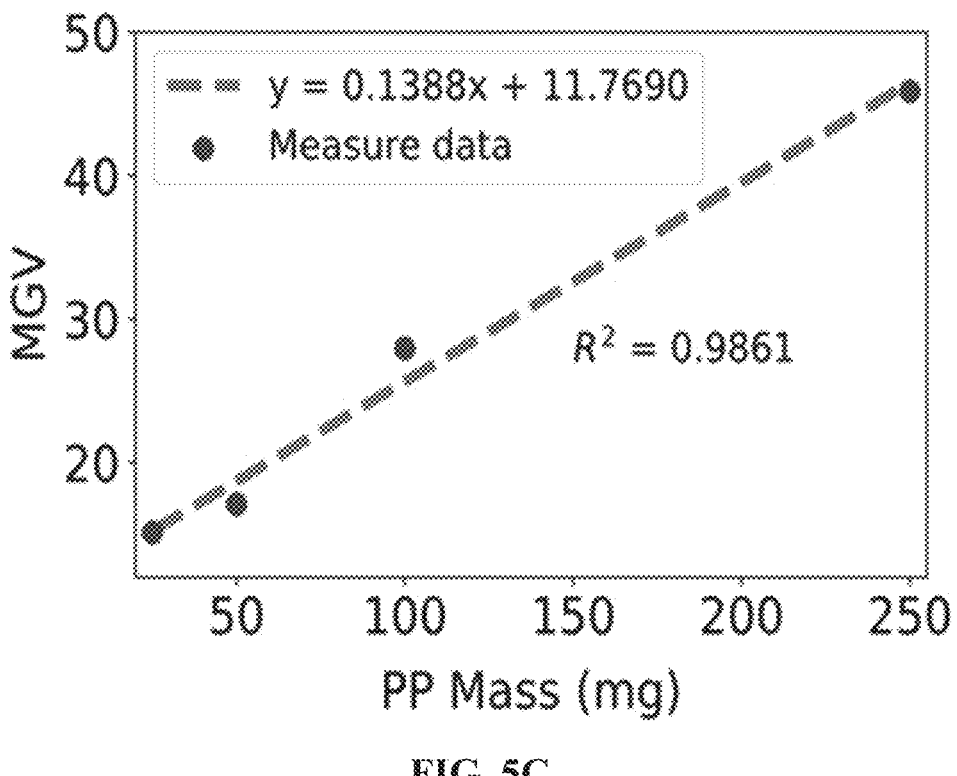
Figure 5D:
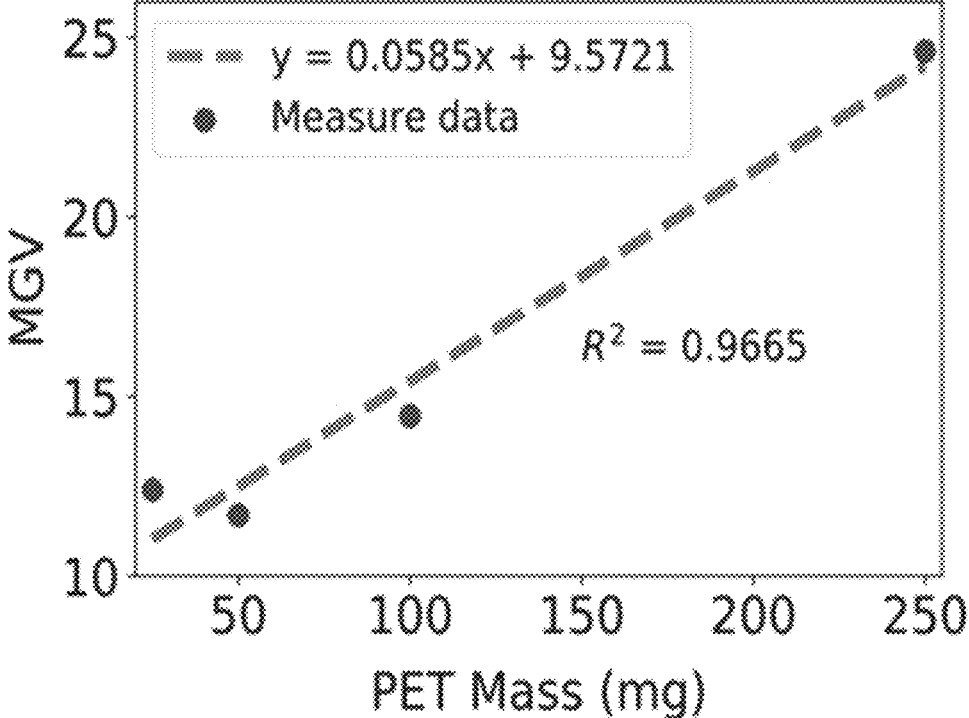
Figure 5E:
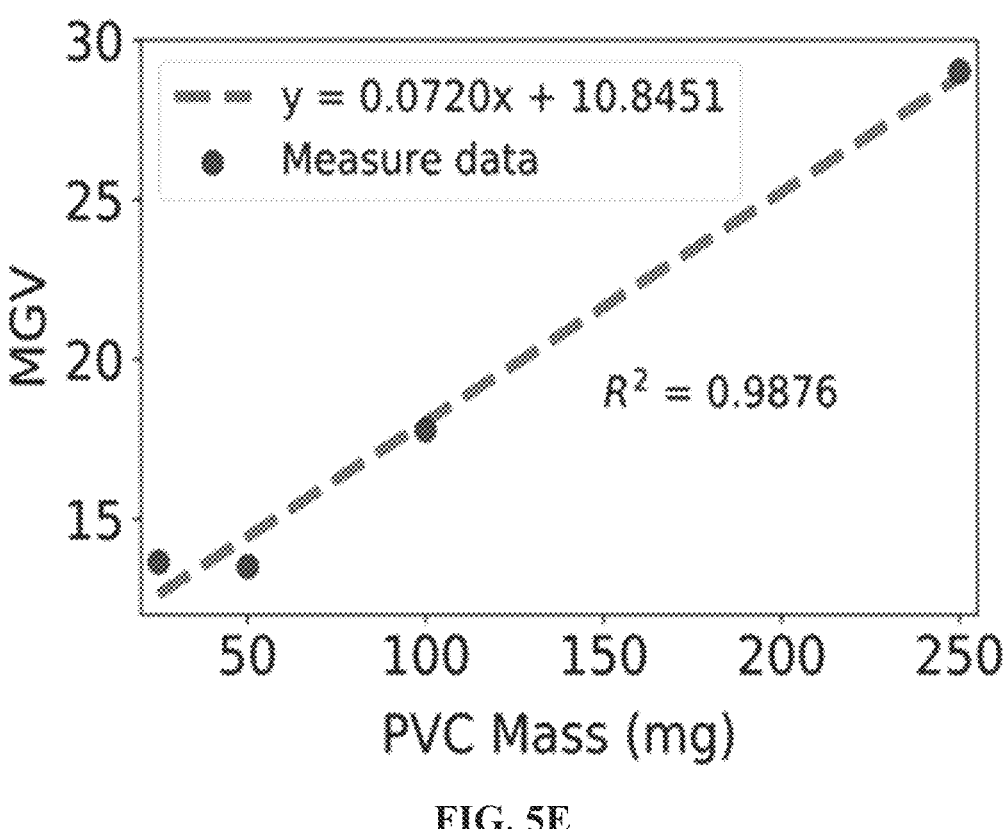

Here, in FIGS. 5A, 5B, 5C, 5D, and 5E, FIG. 5A shows a analysis result of high density polyethylene (HDPE), FIG. 5B shows a analysis result of low density polyethylene (LDPE), FIG. 5C shows a analysis result of polypropylene (PP), FIG. 5D shows a analysis result of polyethylene terephthalate (PET), and FIG. 5E shows a analysis result of polyvinyl chloride (PVC).

As shown in FIGS. 5A-5E, in the present disclosure, in order to numerically evaluate the results of the correlation analyses, Pearson's correlation coefficients are calculated, and as a result, it was found that all types of microplastics show high positive correlations (PP; r=0.9930, LDPE; r=0.9947, HDPE; r=0.9998, PET; r=0.9830, and PVC; r=0.9937).

Accordingly, as described above, when an unknown sample to be analyzed is stained with Nile red, photographed, and the analysis of the fluorescence intensity of the unknown sample is performed, the mass of microplastics of the unknown sample may be estimated by using a reference mass value for each type of microplastics pre-stored in the database.

That is, in the estimating of a mass at S40 described above, after the microplastic sample to be measured is stained with Nile red and a fluorescent image thereof is captured, the fluorescence intensity of the image is analyzed, and fluorescence intensity according to reference mass based on the data stored in the database constructed as described above is compared with the intensity of the fluorescent image of the unknown sample so that the process of estimating the mass value can be performed.

Here, the above-described detailed matters such as quantifying the fluorescence intensity an image by using "ImageJ", building a database about a correlation between the mass of microplastics and a fluorescent image, and a method of estimating the mass of an unknown sample based on the database may be appropriately realized by those skilled in the art with reference to device and method for analyzing an image and device and method for analyzing microplastics according to a prior art. Accordingly, it should be noted that in the present disclosure, in order to simplify description, detailed descriptions of contents that are obvious to those skilled in the art from the contents of the prior art or can be easily understood and implemented by those skilled in the art with reference to the literature of the prior art as described above have been omitted.

Accordingly, as described above, the method for estimating the mass of microplastics by using fluorescent staining and a device for measuring the mass of microplastics according to the embodiment of the present disclosure may be provided. Accordingly, according to the present disclosure, by using fluorescent staining, the mass of microplastics can be quickly and accurately quantified with a simpler configuration and at lower cost than conventional methods.

Figure 6:
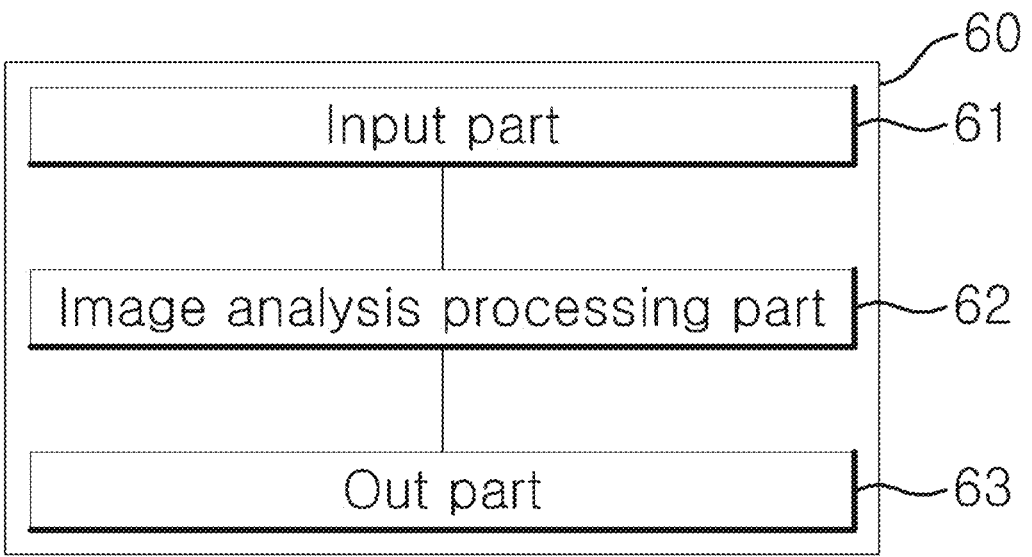
FIG. 6 is a block diagram schematically showing the entire configuration of a device for measuring the mass of microplastics configured by using the method for estimating the mass of microplastics by using fluorescent staining according to the embodiment of the present disclosure.

That is, referring to FIG. 6, FIG. 6 is a block diagram schematically showing the entire configuration of a device 60 for measuring the mass of microplastics configured by using the method for estimating the mass of microplastics by using fluorescent staining according to the embodiment of the present disclosure.

As shown in FIG. 6, the device 60 for measuring the mass of microplastics according to the embodiment of the present disclosure may largely include an input part (or an input interface) 61 configured to receive the fluorescent image of the microplastic sample to be measured, an image analysis processing part (or an image analysis processor) 62 configured to estimate the mass of microplastics by comparing the fluorescent image input through the input part 61 with data pre-stored in the database, and an output part (or an output interface) 63 configured to output and visually display various data including the fluorescent image input through the input part 61 and the analysis result of the image analysis processing part 62.

Here, the image analysis processing part 62 described above may be configured to estimate the mass of microplastics by using the method for estimating the mass of microplastics by using fluorescent staining according to the embodiment of the present disclosure.

Furthermore, in the method for estimating the mass of microplastics by using fluorescent staining according to the embodiment of the present disclosure, learning of a correlation between the intensity of the fluorescent image and the mass of microplastics may be performed by using deep learning or machine learning, or an artificial intelligence learning algorithm, such as an artificial neural network (ANN), a recurrent neural network (RNN), and a convolutional neural network (CNN), and the process of estimating the mass of the microplastic sample based on the result of the learning may be automatically performed. That is, it should be noted that the present disclosure is not necessarily limited only to the contents presented in the above embodiment, but may variously be modified and changed as needed by those skilled in the art within the scope of not departing from the spirit and essence of the present disclosure.

That is, the present disclosure may be provided in the form of a computer program configured to execute, through a computer, a process in which by using the method for estimating the mass of microplastics by using fluorescent staining described above, the fluorescent image of a microplastic sample to be measured is received and is compared with data pre-stored in a database so as to estimate the mass of the microplastics, whereby the mass of microplastics may be estimated with simpler configuration and at lower cost without the need of separate hardware.

Although the method for estimating the mass of microplastics by using fluorescent staining according to the present disclosure has been described in detail as described above, the present disclosure is not limited only to contents described in the above embodiment. Accordingly, it is natural that the present disclosure may be modified, changed, combined, and replaced by those skilled in the art according to design needs and various other factors.

What is claimed is:

1. A method for estimating mass of microplastics by using fluorescent staining, the method comprising:

staining microplastic samples by using a Nile red solution;

capturing a fluorescent image of each of the stained microplastic samples after classifying the stained microplastic samples by mass and after weighing the stained microplastics;

analyzing the captured fluorescent image to quantify a fluorescence intensity thereof, including obtaining pixel-based numerical values of the fluorescence intensity, thereby building a database (DB) about a quantitative correlation between mass and a fluorescence intensity of microplastics; and estimating a mass value of an unknown microplastic sample by comparing a fluorescence intensity of a fluorescent image of the unknown microplastic sample obtained by performing the staining and the fluorescent image capturing with data stored in the database, wherein in the staining, Nile red is dissolved in an acetone solvent to prepare a Nile red staining solution with a predetermined concentration, microplastic particles with a predetermined mass are stained with the Nile red staining solution, and are cooled after being stirred according to preset temperature, time, and stirring speed conditions to prepare the microplastic samples, wherein in the capturing, the microplastic samples stained completely through the staining are separated from the solution through a vacuum filtration process and are dried, the dried microplastic samples are classified by mass according to a predetermined setting, and the capturing of the fluorescent image of each of the microplastic samples classified by mass is performed, and wherein in the estimating, after an unknown microplastic sample to be measured is stained with Nile red and a fluorescent image thereof is captured, a fluorescence intensity of the fluorescent image is analyzed, and a predetermined reference mass based on the quantitative correlation between mass and fluorescence intensity of microplastics stored in the database is compared with the fluorescence intensity of the unknown microplastic sample to derive the mass value of the unknown microplastic sample.

2. The method of claim 1, wherein in the capturing, the fluorescent image of the microplastic sample is captured by using visible blue light with a wavelength of 470 nm.

3. The method of claim 1, wherein the pixel-based numerical values comprise a mean gray value (MGV) of pixels, and wherein in the analyzing, by using an image processing software comprising ImageJ, the MGV of the fluorescent image is calculated to obtain a quantitative correlation between mass and fluorescence intensity of microplastics.

4. The method of claim 1, wherein: in the estimating, learning of a correlation between mass and fluorescence intensity of microplastics is performed by using deep learning or machine learning, or an artificial intelligence learning algorithm comprising an artificial neural network (ANN), a recurrent neural network (RNN), and a convolutional neural network (CNN), and a process of estimating mass of an unknown microplastic sample based on a result of the learning is automatically performed.

5. A device for measuring mass of microplastics, the device comprising:

an input interface configured to receive a fluorescent image of a microplastic sample to be measured;

an image analysis processor configured to estimate mass of microplastics by comparing the fluorescent image input through the input part with data pre-stored in a database; and an output interface configured to output and visually display various data comprising the fluorescent image input through the input part and an analysis result of the image analysis processing part, wherein the image analysis processor is configured to estimate mass of microplastics by using the method of claim 1.

6. A non-transitory computer readable recording medium, when executed by one or more processors, configured to perform the method of claim 1.

7. The method of claim 1, wherein the Nile red staining solution comprises a concentration of 100 μg/mL, wherein 1 g of microplastic particles are stained with the Nile red staining solution, and wherein the microplastic samples are prepared by stirring at a temperature of 50° C. for 30 minutes at 150 RPM using a shaking incubator and then cooling with ice water.

8. The method of claim 1, wherein in the analyzing, a region of interest (ROI) corresponding to stained microplastics is selected in the fluorescent image, and a fluorescence intensity is quantified by obtaining a mean gray value (MGV) of the ROI.

* * * * *